United States Patent [19]
Relph

[11] 3,714,818
[45] Feb. 6, 1973

[54] METHOD AND MEANS OF MEASURING THE MOISTURE CONTENT OF GRAIN

[76] Inventor: Warren L. Relph, Cambria, Iowa 50045

[22] Filed: March 10, 1971

[21] Appl. No.: 122,743

[52] U.S. Cl. ..................................................73/73
[51] Int. Cl. ............................................G01n 33/02
[58] Field of Search .....................73/73; 34/56, 102

[56] References Cited

UNITED STATES PATENTS 3,538,618  11/1970  Neuenschwander ...................34/102

FOREIGN PATENTS OR APPLICATIONS 150,983  9/1950  Australia ................................34/56
528,088  1/1957  Belgium ................................34/56

*Primary Examiner*—Richard C. Queisser
*Assistant Examiner*—C. E. Snee, III
*Attorney*—Zarley, McKee & Thomte

[57] ABSTRACT

A method for determining the moisture content of grain is comprised of the steps of depositing a quantity of grain to be tested at a fixed point above a supporting surface so that the grain will, through gravity, form a uniformly inclined surface extending outwardly and downwardly from the point of deposit, and measuring the magnitude of the angle created between the surface of the grain and a horizontal plane.

The means for measuring the moisture content of grain includes a triangular box having an opening at its upper end and an opening at its lower end. The moisture content of the grain is determined by measuring the slope of the pile of grain which accumulates in the box as the grain is poured into the box.

12 Claims, 8 Drawing Figures

PATENTED FEB 6 1973  3,714,818
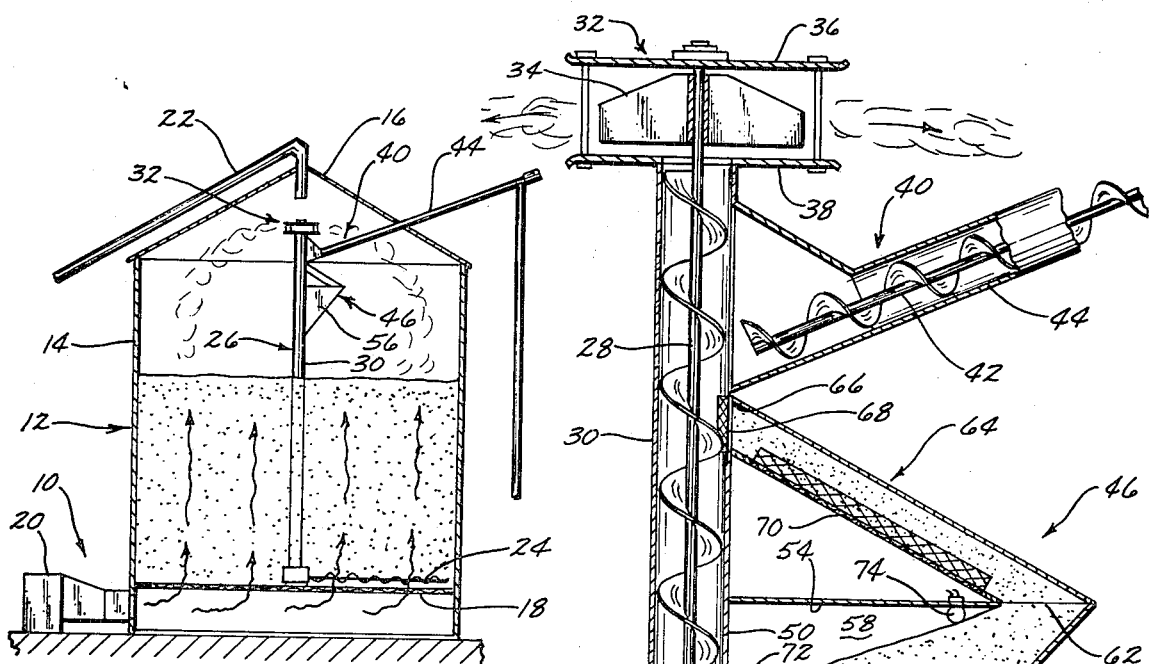
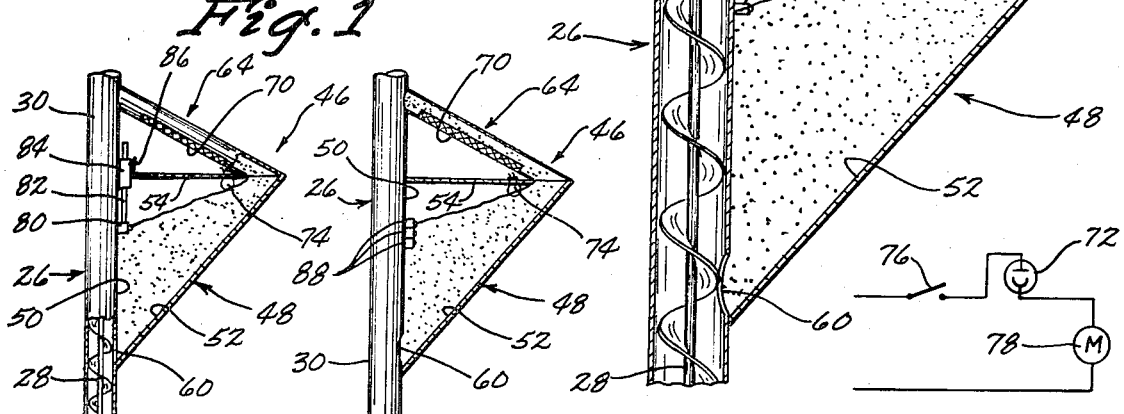
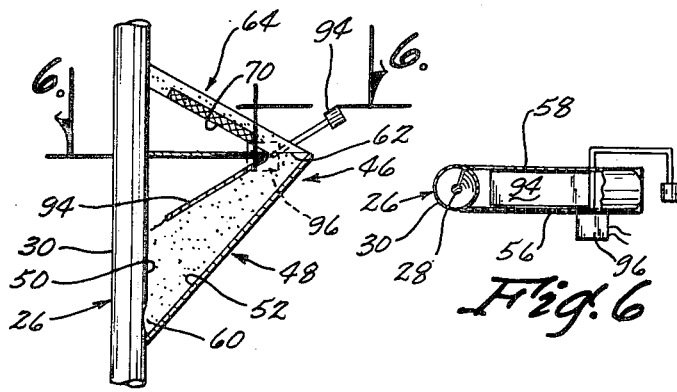
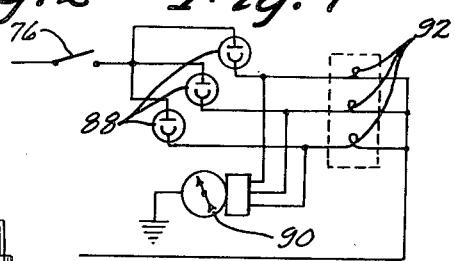
INVENTOR
WARREN L. RELPH
BY
Zarley, M.Ku & Thomte
ATTORNEYS

METHOD AND MEANS OF MEASURING THE MOISTURE CONTENT OF GRAIN

This invention relates to a method and means for measuring the moisture content of grain.

The moisture content of grain is a very important factor both to farmers who sell the grain and to the companies which purchase the grain from the farmers. The moisture content affects the spoilage of the grain during storage, and affects the usability of the grain for commercial purposes. Consequently the price paid to farmers for their grain is dependent upon the moisture content of the grain.

Present methods for testing and evaluating the moisture content of grain are time consuming and require expensive and cumbersome equipment. Many times when farmers bring grain to the elevators for sale they put dry grain on the top of the wagon or truckload and leave the moist grain at the bottom so that sample testing of the truckload or wagonload will result in an indication that the grain is low in moisture content. It is therefore desirable to be able to continuously monitor the flow of grain as it is exchanged from the truck or wagon to the grain elevator. Furthermore, farmers need a simple and inexpensive way to test the moisture content of the grain while they are out in the fields harvesting the grain.

The present invention provides a method and means for quickly and easily evaluating the moisture content of a quantity of grain. The invention is based upon the principle that the moisture content of grain is directly proportional to the angle of repose formed by the upper surface of a pile of grain piled on a flat surface. The greater the moisture content in the grain, the steeper the angle of the upper surface of the pile. As the grain decreases in moisture content, the pile assumes a flatter disposition and its upper surface has a more gentle slope than grain with a higher moisture content. For example, grain having a 30 percent moisture content will form a pile having a steeper angle than grain having 20 percent moisture content.

The invention utilizes the above stated principle by means of a triangular shaped box. Grain enters the top of the box, flows through and out the bottom, and accumulates in the box as it is flowing therethrough. The angle formed by the accumulated grain in the box is directly proportional to the moisture level of the grain.

Therefore a principle object of the present invention is the provision of a method and means for determining the moisture content of grain.

A further object of the present invention is the provision of a method and means wherein the grain can be checked quickly and periodically for its moisture content.

A further object of the present invention is the provision of a method and means wherein the moisture content can be checked in the field as the grain is being harvested.

A further object of the present invention is the provision of a method and means which will permit the continuous monitoring of the moisture content of the grain as it is continuously flowing into a bin.

A further object of the present invention is the provision of a method and means which will permit grain driers to be turned on and off according to the moisture content of the grain therein.

A further object of the present invention is the provision of a method and means which will permit separation of grain moving on a conveyor into separate compartments according to moisture content of the moving grain.

A further object of the present invention is the provision of a method which will permit measuring of moisture content merely by filling a triangular box and measuring the depth of the grain therein.

A further object of the present invention is the provision of a means for determining the moisture content of grain which is economical to manufacture and durable in use.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a sectional view of a grain drier utilizing the present invention for monitoring the moisture content of the grain therein;

FIG. 2 is an enlarged sectional view of the means for measuring moisture content of grain illustrating the invention in use with the grain drier shown in FIG. 1;

FIG. 3 is a view similar to FIG. 2 illustrating a modified form of the present invention;

FIG. 4 is a view similar to FIGS. 2 and 3 and illustrating a further modification of the present invention;

FIG. 5 is a view similar to FIGS. 2 – 4 and illustrating a further modification of the present invention;

FIG. 6 is a sectional view taken along line 6 — 6 of FIG. 5;

FIG. 7 is a schematic diagram of the modification shown in FIG. 2;

FIG. 8 is a schematic diagram of the modification shown in FIG. 4.

Referring to FIG. 1, a grain drier 10 includes a bin 12 having lateral walls 14, a roof 16, and a perforated floor 18. Grain drier 10 also includes a blower 20 and an air return duct 22. A horizontal auger 24 is pivotally mounted at one of its ends to the center of floor 18 and is adapted to rotate in a horizontal plane about the pivotal connection. Auger 24 is adapted to move grain from the outer edge of floor 18 inwardly toward the center of floor 18. A vertical auger 26 is mounted at its lower end at the center of floor 18 and extends upwardly therefrom. Auger 26 includes a screw 28 rotatably mounted within a pipe 30. Vertical auger 26 is adapted to lift grain from the center of floor 18 upwardly to a spreader 32 at the upper end of auger 26. Spreader 32 includes a rotatable blade 34 and two horizontally disposed stationary plates 36, 38. Rotation of blade 34 about a vertical axis causes the grain to be spewed outwardly into the air where it falls toward floor 18 thereby exposing the grain to the air and permitting the removal of moisture from the grain. A removal auger 40 includes an auger screw 42 and an auger pipe 44 and is in communication with the upper end of vertical auger 26. During the drying operation removal auger 40 is deactuated. However, when the grain is dried to the desired moisture content, auger 40 is actuated and removes grain from the drier for storage or other processing.

All the above described structure is conventional and is well known in the art. The numeral 46 designates the device for measuring the moisture content of grain. Device 46 includes a triangular-shaped box 48 having a vertical side wall 50, and inclined bottom wall 52, a horizontal top wall 54, and two lateral walls 56, 58. At the lower end of vertical wall 50 is an outlet opening 60, and at the right-hand end (as viewed in FIG. 2) of top wall 54 is an inlet opening 62. Inlet opening 62 is preferably larger than outlet opening 60 so that grain can be fed into box 48 at a rate faster than it can flow out of opening 60. Either opening 62 or opening 60 can be provided with adjustable gates (not shown) so as to permit varying of the sizes of these openings. Furthermore, while the modification illustrated in the drawings utilizes an outlet opening 60, the invention will also function satisfactorily if there is no outlet opening in box 48. Elimination of an outlet opening permits periodic measuring of the moisture content of the grain, whereas the use of an outlet opening such as opening 60 permits the continuous monitoring of the moisture content of the grain as it flows through box 48. A feed chute 64 is inclined at approximately a 45 degree angle with respect to horizontal, and is in communication at its upper end with an opening 66 in pipe 30 of vertical auger 26. A coarse screen 68 covers opening 66 so as to permit grain to pass therethrough but to prevent cobs or other foreign materials from entering feed chute 64 from vertical auger 26. A fine screen 70 is provided along the length of feed chute 64 so as to permit fine particles and dust to filter out of the grain as it progresses down feed chute 64. The lower end of feed chute 64 is in communication with inlet opening 62 of box 48.

A photoelectric cell 72 is mounted on vertical wall 50 a predetermined height above the juncture between vertical wall 50 and inclined bottom wall 52. A light source 74 is mounted beneath top wall 54 so as to expose photoelectric cell 72 to light except when photoelectric cell 72 is covered by grain.

In operation, vertical auger screw 28 lifts grain upwardly in pipe 30 past opening 68 of feed chute 64. Grain is thus forced into feed chute 64 and falls by gravity down feed chute 64, the dust particles in the grain being filtered out through fine screen 70. The grain then falls, by gravity, downwardly through inlet opening 62 and falls along inclined bottom wall 52 towards outlet opening 60. If outlet opening 60 is closed the grain will fill triangular box 48 up to a point such as shown in FIG. 2. Since there is no pressure for filling box 48 other than the pressure created by gravity acting on the grain, the grain will tend to assume an angle of repose directly proportional to the magnitude of the moisture within the grain. In other words, the upper surface of the grain will tend to be closer to horizontal when the grain is dry, and will tend to have a steeper slope when the grain has a high moisture content. Thus it can be seen, that the moisture content of the grain can be determined either by the angle of the upper surface of the grain or by the depth of the grain which piles against vertical wall 50. Dry grain will pile higher against wall 50 than will grain having more moisture content.

Photoelectric cell 72 provides a means for sensing the depth of the grain piled against vertical wall 50. Referring to FIG. 7, photoelectric cell 72 is electrically connected in series with a master switch 76 and a meter or other indicating device 78. Thus when the grain reaches a depth which buries photoelectric cell 72, the condition of photoelectric cell 72 is reversed, thereby reversing the condition of the circuit shown in FIG. 7 and actuating meter 78. Should the moisture content of the grain be greater than desired, photoelectric cell 72 will be exposed and will not be buried in the grain, and therefore meter 78 will reflect this condition. Thus, photoelectric cell 72 may be placed at a predetermined height on wall 50 so as to reflect a particular desired moisture content of the grain on meter 78.

Device 46 may be used either with or without outlet opening 60. If outlet opening 60 is utilized, device 46 provides means for measuring the moisture content of grain continuously. The grain will continue to flow through triangular box 48, and therefore meter 78 will reflect continuously the moisture content of grain being lifted by vertical auger 26. It is essential that grain be fed into triangular box 48 at a rate faster than it exits from outlet opening 60 so as to maintain box 48 filled to its capacity at all times. The circuit shown in FIG. 7 can include any type of switch for controlling the operation of grain drier 10 so that device 46 will cause grain drier 10 to automatically shut down when the grain reaches the desired degree of dryness. Likewise, device 46 may be utilized to automatically actuate or deactuate removal auger 40 in response to the grain having a particular moisture content.

Referring to the modification shown in FIG. 3, all components are identical to the device shown in FIG. 2 with the exception of the means for mounting the photoelectric cell within box 48. A photoelectric cell 80 is mounted on a vertically disposed rod 82 which is slidably mounted at its upper end within a bracket 84 having a screw lock 86 therein for locking rod 82 against sliding movement within bracket 84. Thus, the height of photoelectric cell 80 above the lower end of vertical wall 50 can be manually adjusted so that photoelectric cell 80 will reflect an increase of moisture content in the grain above a predetermined level.

Referring to the modification shown in FIG. 4, all components of device 46 are identical to that shown in FIG. 2 with the exception of the photoelectric cells therein and the electrical circuitry. A plurality of photoelectric cells 88 are mounted at different levels on vertical wall 50. Referring to FIG. 8, photoelectric cells 88 are connected in parallel with one another and in parallel with a meter 90 and three indicator lights 92. Thus, each photoelectric cell independently reflects a unique level of grain within box 48, thereby providing means for determining a plurality of different moisture levels which may occur within the grain in box 48.

Referring to the modifications shown in FIGS. 5 and 6, device 46 is identical to that shown in FIG. 2 with the exception that a hinged plate 94 is utilized in place of the photoelectric cells for determining the angle of repose of the grain within box 48. Hinged plate 94 is hinged at its upper end to the margin of inlet opening 62 and is adapted to swing about a horizontal axis. A counterweight 96 is attached to hinge plate 94 so as to neutralize the moment about the hinged connection of plate 94 resulting from the weight of plate 94. Consequently, plate 94 is substantially weightless with regard to its hinged connection. As the grain flows from feed chute 64 into box 48, plate 94 assumes the same angle as does the upper surface of the grain within box 48. A motor, rheostat, or other conventional sensing device 96, is connected to plate 94 and is adapted to actuate an indicator such as a meter or a warning light (not shown).

While the device is shown in the drawings in use with the grain drier, it can be used in any of a number of applications. It could be mounted on the back of a truck or could be used as a portable device for measuring the moisture content of grain in the field. It may be used for testing the moisture content of grain while grain is flowing through the box, in which case outlet opening 60 is utilized, or it may be used merely to test random samplings of the grain in which case opening 60 may be closed.

While photoelectric cells and a hinged plate are shown in drawings for sensing the angle of repose of the grain within box 48, other methods and means may be used. For example, the triangular box could be filled, and then a measuring stick could be used to determine the depth of the grain therein. Also, calibrations may be provided on wall 50 so that the depth of the grain can be determined by inspection. Transparent walls may also be provided in box 48 so as to permit visual inspection of the angle of repose of the grain therein.

By means of the various arrangements of photoelectric cells shown in the drawings, the device of the present invention can be used for actuating switches in any of a variety of applications. For example, the device may be used to sort grain passing on a conveyer into separate bins so that the grain can be separated according to the moisture content therein. The device can be used as shown in the drawings to monitor grain driers and to cause the grain to be automatically removed from the grain driers once it reaches the desired dryness.

Thus it can be seen that the method and means of the present invention accomplishes at least all of its stated objectives.

I claim:

1. A method for determining the average moisture content inside the kernels of a given quantity of grain, comprising,
    depositing a quantity of grain to be tested at a fixed point above a supporting surface so that the grain will through gravity form a uniformly inclined surface extending outwardly and downwardly from the point of deposit,
    maintaining the supply of grain to be tested in sufficient quantities so that the inclined surface of said grain extends to and forms an apex substantially at the point where said grain is deposited above said supporting surface,
    measuring the magnitude of the angle created between said inclined surface of said grain and a horizontal plane intersecting said inclined surface, whereby the magnitude of said angle can be compared to similar angles formed by surfaces of grain of known moisture content subjected to the aforesaid conditions whereby the moisture content of the grain so deposited can be ascertained.

2. The method of claim 1 wherein said angle is measured when said grain is in a static condition.

3. The method of claim 1 wherein said angle is measured when said grain is progressively flowing.

4. The method of claim 1 wherein said grain is deposited on said supporting surface by pouring said grain into an enclosed box through an opening in the top wall of said box until said grain within said box blocks said opening.

5. Apparatus for measuring the moisture content of grain comprising:
    a box having an inclined bottom wall, an upstanding side wall, and a top wall positioned over said bottom wall;
    said top wall having an inlet opening therein at a point spaced from said side wall;
    feed means for pouring grain into said box through said inlet opening whereupon said grain will fall upon said bottom wall and accummulate in a pile between said bottom wall and said side wall; and
    measuring means for measuring the slope of the upper surface of said pile.

6. Apparatus according to claim 5 wherein said side wall has a lower end and an outlet opening in said lower end for permitting grain to flow out of said box; said outlet opening being smaller than said inlet opening whereby said grain may enter said box through said inlet opening at a rate faster than it can leave said box through said outlet opening.

7. Apparatus according to claim 6 wherein said feed means comprises an elongated feed chute having an inlet opening and a discharge opening, said discharge opening being in communication with said inlet opening of said box; a conveyor means being in communication with said inlet opening of said discharge chute whereby grain being conveyed by said conveyor means will enter said feed chute.

8. Apparatus according to claim 7 wherein said feed chute is inclined downwardly from said conveyor means whereby gravity will cause grain to enter said feed chute from said conveyor means.

9. Apparatus according to claim 8 wherein said outlet opening of said box is in communication with said conveyor means.

10. Apparatus according to claim 5 wherein said measuring means includes a sensing device on said side wall for sensing the depth of said pile of grain at said side wall; indicator means being associated with said sensing means for indicating the depth of said pile of grain at side wall.

11. Apparatus according to claim 10 wherein said sensing means comprises a plurality of photoelectric cells.

12. Apparatus according to claim 5 wherein said measuring means comprises a plate pivotally mounted about a horizontal axis adjacent said inlet opening of said box and between said inlet opening and said side wall.

* * * * *